US005109240A

United States Patent [19]

Engl et al.

[11] Patent Number: 5,109,240

[45] Date of Patent: Apr. 28, 1992

[54] ELECTRICALLY CONTROLLABLE PRINTING FORM FOR A PRINTING MACHINE

[75] Inventors: Albert Engl, Warngau; Peter Meinke, Starnberg; Herbert Stöckl, Augsburg, all of Fed. Rep. of Germany

[73] Assignee: MAN Roland Druckmaschinen AG, Offenbach am Main, Fed. Rep. of Germany

[21] Appl. No.: 422,782

[22] Filed: Oct. 17, 1989

[30] Foreign Application Priority Data

Oct. 29, 1988 [DE] Fed. Rep. of Germany ....... 3836931

[51] Int. Cl.[5] ........................ G01D 15/06; B41B 1/02; B41J 27/16

[52] U.S. Cl. .................................... 346/155; 101/401; 400/119

[58] Field of Search ........................................ 346/155

[56] References Cited

U.S. PATENT DOCUMENTS 3,678,852 7/1972 Feinleib et al. .
4,030,107 6/1977 Tagawa .............................. 346/155
4,448,867 5/1984 Ohkubo et al. ................. 346/155 X
4,748,464 5/1988 Pannekoak et al. ................ 346/155
4,833,990 5/1989 Hirt et al. .
4,897,676 1/1990 Sedberry ............................ 346/155

*Primary Examiner*—George H. Miller, Jr.
*Attorney, Agent, or Firm*—Frishauf, Holtz, Goodman & Woodward

[57] ABSTRACT

To permit computer control, for example from a control console in a publisher's office, of the subject matter to be printed from a printing cylinder, the printing cylinder (3) has a layer of semiconductor material thereon, which, by doping, includes capacitative or inductive domains (15, 33), selectively energized in accordance with control from the computer through controllable electronic switches (16, 29), such as transistors formed in the semiconductor layer. Ferrofluidic ink can be attracted by charges onto capacitors formed in the semiconductor layer; the capacitors are charged, selectively, through the transistor electronic switches which are located and connected in a matrix. Packing densities of over 160 domains and switching elements per $mm^2$ are readily possible and suitable, for example, for newspaper printing. Higher packing densities, for high quality printing, can be obtained by well known microelectronic technology. Further, depolarized regions are hydrophobic, and permit acceptance of printing ink, whereas polarized domains are hydrophilic, attract water, thereby permitting use of well known lithographic-type offset printing.

20 Claims, 1 Drawing Sheet

Fig.1
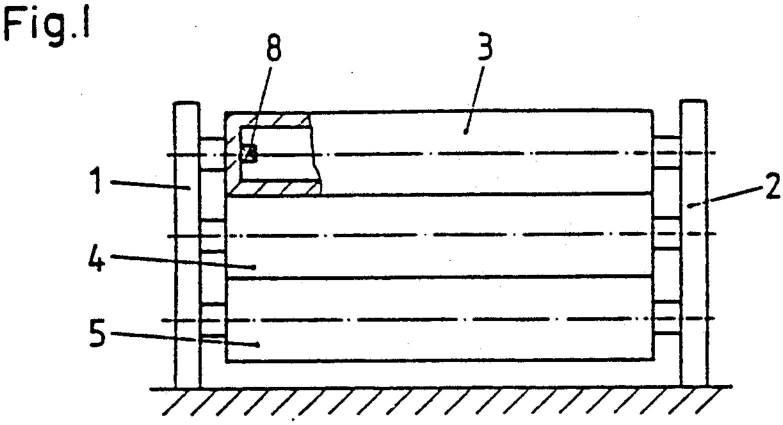
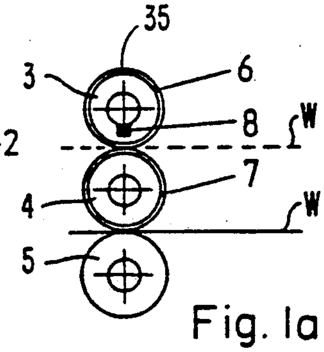
Fig. 1a
Fig.2
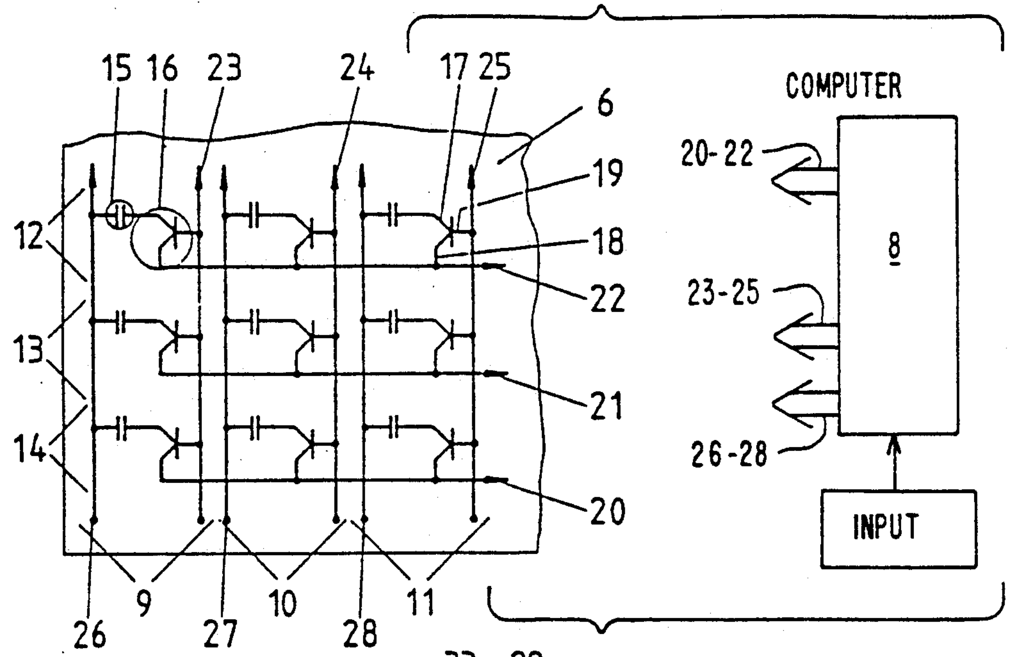
Fig. 3
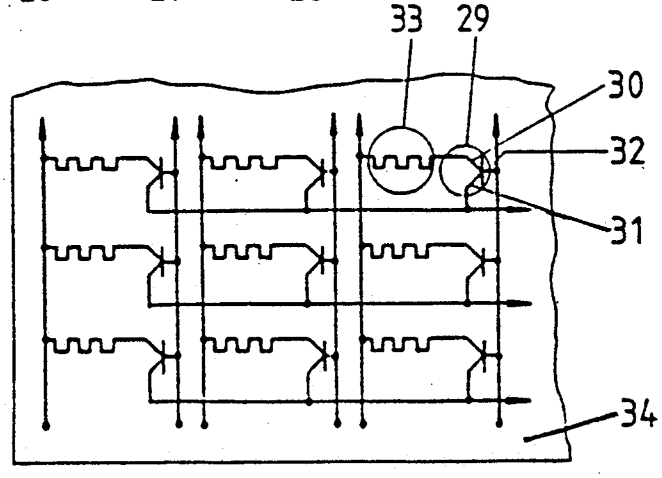

ELECTRICALLY CONTROLLABLE PRINTING FORM FOR A PRINTING MACHINE

Reference to related patent, the disclosure of which is hereby incorporated by reference, assigned to a related company of the assignee of the present application: U.S. Pat. No. 4,833,990, Hirt et al.

The present invention relates to a printing form for a printing machine which has regions from which printing ink is to be transferred and other regions which are left blank and in which the specific ink transferring regions and blank regions can be electrically selected and repeatedly either activated or inactivated.

Definition

For ease of explanation, the term "activated region" will refer to a region in which ink can be accepted, so that that region can transfer ink to a substrate, for example a paper web; and a region which is referred to as "inactivated" or "neutralized" or "deactivated" is one which does not accept ink, that is, is hydrophilic and accepts water or a similar damping liquid.

Background

U.S. Pat. 4,833,990, Hirt et al, describes a system to generate ink accepting regions and ink repelling regions in localized zones by making a printing form of ferroelectric material which is locally polarized or depolarized, respectively. This requires an additional device, for example a printing cylinder, for the printing form which has the requisite electrodes and heat sources required for changing the polarization regions, as desired.

The Invention

It is an object to provide an electronically activatable printing form which is solely operated by electrical and/or electronic circuit elements and which does not require any external accessory or auxiliary apparatus.

Briefly, a semiconductor layer is located on a printing carrier plate. The semiconductor layer has electrically reactive domains arranged on the layer in a raster, for example in a row or line and column matrix. Controllable electronic switches, such as transistors, are coupled to the domains of the semiconductor layers. The electronic switches are selectively activated or not activated to thereby activate or not activate the reactive domains coupled to the switches.

In general, the semiconductor layer has capacitative or inductive regions thereon, arranged in the raster, which can be activated, excited or charged by the selectively controllable electronic switches.

The system and arrangement has the advantage that a control terminal, for example in a publisher's office, can generate the requisite control signals and apply them to the printing form directly so that the electronically activated regions will be reproduced on the form as controlled, and will be available directly on the form cylinder. This then eliminates the necessity of placing a customary printing plate on a printing cylinder, which also eliminates the manufacture of the printing plate, the generation of the printed subject matter thereon, and placement of the printing plate on the printing cylinder, for example by stretching it thereover. Additionally, the subject matter to be printed can be changed during operation directly from a computer control console, so that the printed subject matter can be remotely controlled without requiring replacement of a printing plate on the printing cylinder.

In accordance with a feature of the invention, the components necessary to control the domains, by the switches, can be located within the cylinder carrying the new printing form. This has the additional advantage that no additional space is needed and the components and devices can be easily protected against environmental influences which might be detrimental thereto.

In accordance with a preferred feature of the invention, the semiconductor layer is a thin layer of a silicon-containing substance, or a thin silicon layer, well known from computer tecdfhnology. A transistor -capacitor or transistor-inductance pattern can then be introduced into the silicon layer by customary will known diffusion methods. As generally known from microelectronic technology, a packing density of 600 domains per square millimeter are readily generated. The printing form thus can be used also for printing requireing high quality and fine definition. For ordinary newspaper printing and similar graphic requirements, a packing density, that is, a rastering of 160 domains per square millimeter is suitable. Such domains can readily be formed by capacitors or inductances diffused into the silicon layer.

An address bus is coupled to the respective transistors so that a computer which is located either remotely in fixed position or within the form cylinder itself can control the respective transistors. A data bus transmits switching commands; a supply bus controls the conduction state of the transistors, which are a preferred switching element within the semiconductor layer. The domains, formed in elements and comprising electrostatic, that is capacitative, or electromagnetic, that is inductive patterns, can then be used to permit a suitable ink, such as a ferro-fluid or an electrostatically charged ink or toner to adhere directly on the semiconductor layer or on a thin protective layer which covers the semiconductor layer. This this protective layer, preferably, should be wear-resistant.

In those regions where the domains are depolarized, the surface becomes hydrophobic, which means it rejects water, but accepts the ferro-electric ink, thus providing for transfer of ink from that specific domain. The regions above polarized domains, however, are hydrophilic, that is, accept water or similar damping liquid and reject ink, so that the substrate will remain unaffected, or unprinted; the arrangements of polarized and depolarized domains, then, provide the subject matter or pattern to be printed.

DRAWINGS

FIG. 1 is a schematic front view of cylinders of a rotary printing machine;

FIG. 1*a* is a schematic side view thereof, omitting all elements not necessary for an understanding of the present invention;

FIG. 2 is a developed view of a semiconductor layer using capacitors and transistor combinations for the respective domains; and FIG. 3 is a developed view of the semiconductor layer using inductance-transistor combinations for the resptective domains.

DETAILED DESCRIPTION

High operating speed can be obtained with the printing form in accordance with the present invention. Preferably, and particularly when using high operating speed, a form cylinder 3 is used which is rotatably secured between two side walls 1, 2 of a printing system. The cylinder is driven, as well known, by a gear drive, by a motor, or the like, not shown. A rubber blanket cylinder 4 is engaged against the form cylinder 3 if the system operates in accordance with offset printing. A paper web W is passed between the rubber blanket cylinder and an impression cylinder 5. The rubber blanket cylinder 4 is not strictly necessary, and the present invention is not limited to an offset mode of printing. If direct printing is to be carried out, the paper web W is then passed above the blanket cylinder 4, as shown by the broken line web W, or the blanket cylinder 4 is omitted entirely, so that the impression cylinder 5 replaces the blanket cylinder 4 and the paper web is passed between the form cylinder 3 and a suitable impression cylinder.

Form cylinder 3 has on its surface the printing form 6, see FIG. 1*a* . The printing form 6 is a thin layer of semiconductor material, preferably silicon. The semiconductor layer 6, as shown in FIG. 1*a*, is engaged against cylinder 4 which is covered with a rubber blanket or rubber sleeve 7.

The semiconductor layer 6 on the form cylinder 3 is shown in two-dimensional, developed form in FIG. 2, that is, is shown in form of a flat surface. The semiconductor layer 6 may, of course, also be tubular, thereby permitting continuous endless printing over the circumference of the printing cylinder. The semiconductor layer can be applied securely to the form cylinder 3 and covered by a protective layer 35.

As best seen in FIG. 2, the respective domains are subdivided into column 9, 10, 11 and rows or lines 12, 13, 14. This matrix-like arrangement permits easy control of the capacitors 15 by electronic switches, shown as transistors 16. The transistors 16, preferably, and as is customary, are field effect transistors (FETs) or ,metal-oxide silicon transistors (MOS transistors). They have a drain electrode 17, a source electrode 18, and a gate or control electrode 19.

Depending on the conduction state of a respective transistor 16, a capacitor 15 can be charged when the transistor 16 is controlled to conduction. By applying a suitable voltage or ground leve., discharge of the capacitors by control of the transistors in readily possible. The transistors are controlled by suitable doping of the silicon layer ot form conduction paths, or by application of lead or connecting strips in or on the semiconductor layer 6. By suitable choice of energization or deenergization of the driver connection, for example driver connection 22 in line 12 and the column connection 26 in row 9, as well as control of the associated gate electrode by line 23, the upper left domain of the capacitor 15, within the circle, is controlled by the transistor 16, within the circle, to charge the capacitor 15. This charge can be maintained during operation by maintaining the applied operating voltage. If the insulation of the system is sufficient, it may be possible to only charge the capacitors 15 just before starting to print, so that they can attract printing ink, for transfer from the form cylinder 3 to a substrate web or to the offset cylinder 4 at each rotation of the form cylinder 3. If the insulation is not so good, it is also possible to recharge the respective capacitors after some predetermined numbers of revolution, to be determined by experience, for example after every 10th or 100th revolution of the form cylinder 3.

FIG. 2 illustrates the capacitors 15 ad domains, that is, as domains which, when the capacitors are charged, are capable of attracting ink.

IT is not necessary that the printing ink be attracted by electrostatic charge. FIG. 3 illustrates a portion 34 of a semiconductor layer in which a transistors 29 with source electrodes 31, drain electrodes 30, and gate electrodes 32 is shown. An inductance 33 is serially connected with the drain electrode. The inductance can be a meander or zig-zag pattern formed on or in the semiconductor layer 6. This is readily possible by suitable doping of the semiconductor layer 34, to then genrate a quasi coreless or ironless inductance.

Upon controlling transistor 29 to conduction, current will flow through inductance 33 via the transistor 29, as controlled thereby, thus generating a corresponding magnetic field through which ink particles from a ferrofluidic ink can be attracted. This attraction will be in accordance with the design or image to be printed.

In the embodiment of FIG. 3, the transistor 29 must be conductive continuously, that is, must be switched through, be energized with voltage and carry current since, otherwise, the magnetic field through the inductance 33 cannot be maintained. A "white" or otherwise blank spot will arise at those regions where the inductances are not current carrying.

Preferably, the control electronics is a computer 8 which is located within the form cylinder 3, see FIG.1. The respective control and supply voltages for the electronics 8 can be coupled to the computer either via slip rings or contactless for example with a rotary transducer or transformer, or other transmission system. Thus, control and supply voltages for the electronics within the form cylinder 3 can be applied to the semiconductor layer 6.

The jacket of the form cylinder 3 can be formed with suitable break likes or regions in order to provide for accessibility to the semiconductor layer from the interior of the form cylinder and to the respective connecting lines, such as lines 20-22, 23-25 and 26-28. Connections for supply and control voltage can also be made, if desired, over the end faces of the form cylinder 3, either by contacting or non-contacting arrangements, well known in electrical and electronic control technology relating to systems in which relatively movable elements are to be supplied with power and/or control signals.

Various changes and modifications and any features described herein may be used with any of the othrs, within the scope of the inventive concept.

A suitable cover layer 35 (FIG. 1*a*) over the semiconductor layer 6 Ceramic, Teflon is preferably used when there is no offset cylinder 4 having a rubber coating or jacket 7, and if paper is the substrate, since the rubber jacket 7 is less abrasive than the surface of paper, for example, newsprint.

What is claimed is:

1. In combination with a printing machine, a printing form (3) and means (4) for supporting a substrate (W) in printing relation with said printing form, wherein the printing form has printing regions from which printing ink is to be transferred to the substrate (W), and blank regions where no ink is to be transferred to the substrate (W), said form comprising, in accordance with the invention, means for selectively electrically controlling the particular location of the printing regions and blank regions, wherein said electrical control means includes a semiconductor layer (6) located on the printing form (3), said semiconductor layer having electrically reactive domains (15, 33) arranged on or in the layer in a raster;

controllable electrical switching means (16, 29) coupled to said domain; and means (8) for electrically controlling said electric switching means to selectively activate or deactivate the reactive domains coupled to the switching means and thereby selectively form ink accepting and damping fluid accepting regions on said printing form.

2. The printing form of claim 1, wherein said electrically reactive domains comprise capacitor domains (15).

3. The printing form of claim 1, wherein said electrically reactive domains comprise inductive domains (33).

4. The printing form of claim 1, wherein said raster comprises a matrix having columns (9, 10, 11) and lines or rows (12, 13, 14), and said electrically reactive domains (15, 33) are located at the intersections of respective rows and columns.

5. The printing form of claim 1, wherein said printing form (3) comprises a rotatable cylinder;

said means (8) for electrically controlling the electronic switching means (16, 29) comprises a control computer (8);

said switching means (16, 29) comprises transistors;

and said raster includes row and column supply connections (20, 21, 22; 26, 27, 28) and control connections (23, 24, 25), respectively coupled to the electrodes of said transistors for selectively controlling transistors located at intersections of the row and column connections to conduction or non-conduction for, respectively energizing or leaving unenergized the electrically reactive domains coupled to the respective transistor.

6. The printing form of claim 5, wherein the respective transistor is energized during the entire period that printing is being carried out.

7. The printing form of claim 1, wherein the packing density of said domains (15, 33) is at least 160 domains per square millimeter.

8. The printing form of claim 1, wherein the packing density of said switching means (16, 29) corresponds to that of the packing density of the domains.

9. The printing form of claim 1, wherein the semiconductor layer (6) comprises silicon;

and wherein said switching means and said electrically reactive domains (15, 33) are formed within said silicon layer by doping.

10. The printing form of claim 9, further including power supply and control connection means (20–28) formed in said silicon layer (6) by doping.

11. The printing form of claim 1, further including a wear-resistant layer (35) covering the semiconductor layer (6).

12. The printing form of claim 1, wherein said means for electrically controlling the electrical switching means (16, 29) comprises a control computer (8).

13. The printing form of claim 1, further including printing ink applied on said form, said printing ink comprising at least one of:

ferrofluidic ink;

electrostatically charged ink;

toner.

14. The printing form of claim 1, wherein said switching means comprises transistors (16, 29); and wherein said means (8) for electrically controlling said switching means selectively control said transistors to conduction or non-conduction for, respectively, energizing or leaving unergized the electrically reactive domains coupled to the respective transistors.

15. The printing form of claim 14, wherein said raster includes row and column supply connections (20, 21, 22; 26, 27, 28) and control connections (23, 24, 25), respectively coupled to the electrodes of said transistors for selectively controlling the transistors located at intersections of the row and column connections to conduction or non-conduction.

16. The printing form of claim 4, wherein said electrically reactive domains comprise capacitor domains (15).

17. The printing form of claim 14, wherein said electrically reactive domains comprise inductive domains (33).

18. The printing form of claim 14, wherein the packing density of said switching means (16, 29) corresponds to that of the packing density of the domains.

19. The printing form of claim 14, wherein the semiconductor layer (6) comprises silicon;

and wherein said switching means and said electrically reactive domains (15, 33) are formed within said silicon layer by doping.

20. The printing form of claim 19, further including power supply and control connection means (20–28) formed in said silicon layer (6) by doping.

* * * * *